US007876372B2

(12) United States Patent
Ishibashi

(10) Patent No.: US 7,876,372 B2
(45) Date of Patent: Jan. 25, 2011

(54) DIGITAL CAMERA METHOD THEREFOR FOR INITIATING DUST REMOVAL OPERATIONS RESPONSIVE TO LIVE VIEW OPERATION STATES

(75) Inventor: Satsuki Ishibashi, Ina (JP)

(73) Assignee: Olympus Imaging Corp., Tokyo (JP)

( * ) Notice: Subject to any disclaimer, the term of this patent is extended or adjusted under 35 U.S.C. 154(b) by 696 days.

(21) Appl. No.: 11/893,311

(22) Filed: Aug. 15, 2007

(65) Prior Publication Data
US 2008/0049136 A1    Feb. 28, 2008

(30) Foreign Application Priority Data
Aug. 22, 2006  (JP)  ............... 2006-225698

(51) Int. Cl.
*H04N 5/222* (2006.01)
*H04N 5/225* (2006.01)
(52) U.S. Cl. .................... 348/333.01; 348/335
(58) Field of Classification Search ............... 348/241, 348/333.01, 333.11, 335
See application file for complete search history.

(56) References Cited
U.S. PATENT DOCUMENTS

| 6,453,124 | B2 | 9/2002 | Morimoto |
| 7,006,138 | B2 | 2/2006 | Kawai |
| 7,084,920 | B2 | 8/2006 | Kobayashi |
| 2003/0214599 | A1 | 11/2003 | Ito |
| 2003/0218685 | A1 | 11/2003 | Kawai |
| 2004/0047625 | A1 | 3/2004 | Ito |
| 2004/0169761 | A1 | 9/2004 | Kawai |
| 2005/0001924 | A1* | 1/2005 | Honda ................. 348/348 |
| 2005/0237421 | A1 | 10/2005 | Kosugiyama |
| 2006/0062568 | A1* | 3/2006 | Kawai ................. 396/439 |
| 2007/0030376 | A1* | 2/2007 | Kosaka ............... 348/335 |

FOREIGN PATENT DOCUMENTS

| CN | 1520165 | 8/2004 |
| JP | 07-151946 | 6/1995 |
| JP | 2003-319222 | 11/2003 |
| JP | 2004-242158 | 8/2004 |
| JP | 2005-341381 | 12/2005 |

OTHER PUBLICATIONS

Chinese Office Action for Chinese Patent Application No. 2007101465720, mailed on Aug. 8, 2008 (4 pgs.) (with English Translation (6 pgs.)).

* cited by examiner

*Primary Examiner*—Timothy J Henn
(74) *Attorney, Agent, or Firm*—Straub & Pokotylo; John C. Pokotylo

(57) ABSTRACT

Disclosed is a digital camera with a live view display function, which is designed to make dust less noticeable. The digital camera includes an image pickup device that receives a subject light flux which has passed a photographing lens and outputs a subject image signal, a dust-proof optical element arranged in front of the imaging surface of the image pickup device, and a display device that provides a live view display of the subject as a move image based on the output of the image pickup device. The digital camera executes a dust removal operation of vibrating the dust-proof optical element in response to initiation or stop of a live view display by the display device.

6 Claims, 8 Drawing Sheets

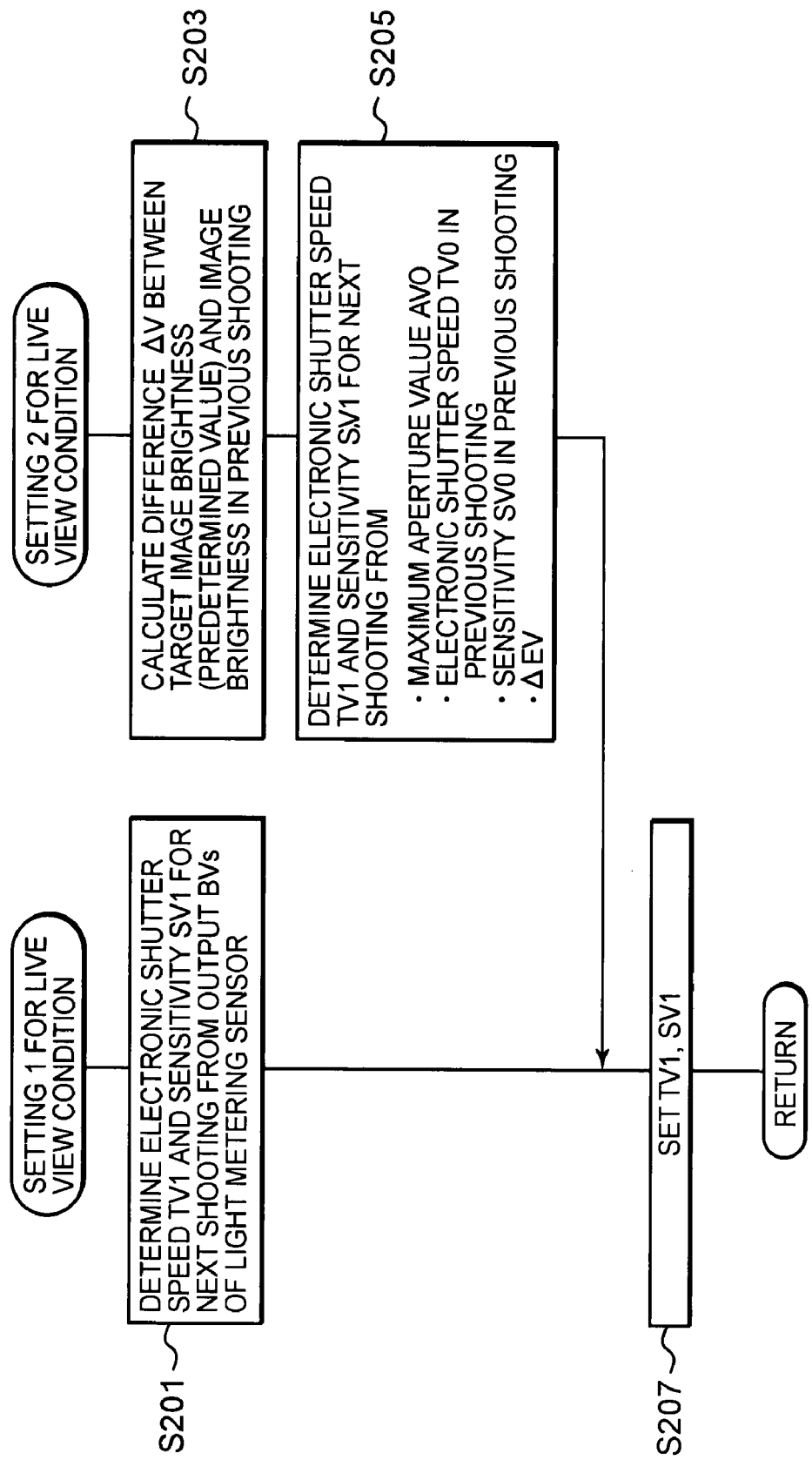

DIGITAL CAMERA METHOD THEREFOR FOR INITIATING DUST REMOVAL OPERATIONS RESPONSIVE TO LIVE VIEW OPERATION STATES

CROSS REFERENCES TO RELATED APPLICATION

This application is based upon and claims the benefit of priority from prior Japanese Patent Application No. 2006-225698, filed on Aug. 22, 2006, the entire contents of which are incorporated herein by reference.

BACKGROUND OF THE INVENTION

1. Field of the Invention

The present invention relates to a digital camera with a live view display function, which repeatedly shoots a subject image to display a moving image on a display device.

2. Description of the Related Art

When dust adheres to the surface of an optical element provided near the imaging surface of an image pickup device, its shadow enters the image, thereby lowering the image quality. The first approach to this problem is to seal the image pickup device part as much as possible. The second approach is to expose the image pickup device of, for example, a digital single-lens reflex camera to the outside using a special operational mode with the lens camera body removed from the camera and blow off adhered dust off the display surface of the image pickup device by a blower or the like. As the third approach, there is a technique of vibrating a vibration exciting member, such as a piezoelectric element, securely mounted to the peripheral portion of a dust-proof filter to thereby vibrate the dust-proof filter, thereby removing adhered dust (see Japanese Patent Application Laid-Open No. 2003-319222). As the fourth approach, there has been proposed a technique of erasing a dust image through image processing upon detection of adhesion of dust (see Japanese Patent Application Laid-Open No. 2005-341381).

BRIEF SUMMARY OF THE INVENTION

A digital camera of the present invention has a live view display function of displaying an image formed on an image pickup device by a photographing lens as a moving image to be viewed, and a dust removing function of removing dust on an optical element present between the photographing lens and the image pickup device, and activates the dust removing function at a timing of at least before or after activation of the live view display function.

As an exemplary structure of the digital camera of the present invention, the digital camera comprises an imaging part that receives a subject light flux which has passed a photographing lens and outputs a subject image signal; an image processing part that processes the subject image signal output from the imaging part to thereby generate image data; a display part that displays the image data generated by the image processing part; a control part that executes a live view display operation by controlling the imaging part, the image processing part and the display part; an optical element arranged in front of an imaging surface of the imaging part; a vibration exciting member that vibrates the optical element; and a drive circuit that supplies a periodic electric signal to the vibration exciting member, wherein the control part supplies a control signal for vibrating the optical element to the drive circuit at a predetermined timing associated with the live view display operation.

The present invention can be understood as an invention of a control method for the digital camera.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 8 is a flowchart for setting 1 for a live view condition and setting 2 for a live view condition according to the embodiment of the invention.

DETAILED DESCRIPTION OF THE PREFERRED EMBODIMENT

Preferred embodiments of the invention are described below with reference to the accompanying drawings.

Figure 1:
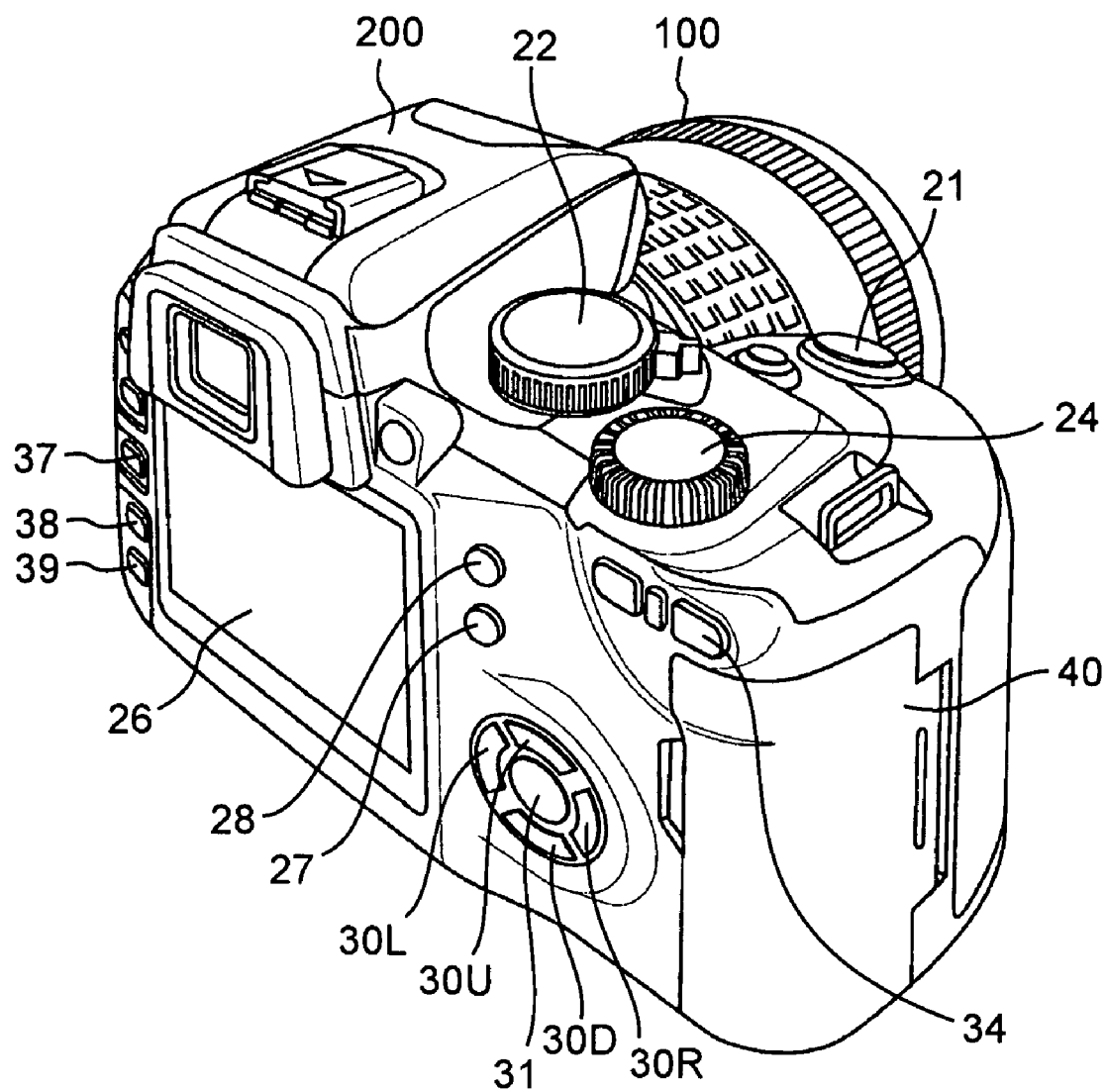
FIG. 1 is an exterior perspective view of a digital single-lens reflex camera according to one embodiment of the present invention.

Referring to the accompanying drawings, a description will be given below of a preferred embodiment using a digital single-lens reflex camera to which the present invention is adapted. FIG. 1 is an exterior perspective view of a digital single-lens reflex camera according to the embodiment of the invention as seen from the rear thereof. This digital camera has a so-called live view display function of forming a subject image, formed by an photographing lens, on an image pickup device, and displaying a moving image on a display device, such as a liquid crystal display (LCD) monitor, to view the subject image, based on the output of the image pickup device. It is also possible to acquire a still image in response to a shooting instruction from a camera user and record the still image on a recording medium.

A release button 21, a mode dial 22, a control dial 24, etc. are arranged on the top surface of a camera body 200. The release button 21 has a first release switch (hereinafter referred to as "1R") which becomes ON when the camera user half presses the release button 21, and a second release switch (hereinafter referred to as "2R") which becomes ON when the camera user fully presses the release button 21. When the 1R is ON, the camera executes a shooting preparation operation, such as focus detection, focusing of the photographing lens, and light metering for the brightness of a subject. When the 2R is ON, the camera executes a shooting operation of acquiring image data of the subject image based on the output of a CCD (Charge Coupled Device) 221 (see FIG. 2) as an image pickup device.

The mode dial 22 is an operational member configured in a rotatable manner. As an icon or symbol representing a shooting mode and provided on the mode dial 22 matches with an index, the shooting mode can be selected. Selectable shooting modes include a full-auto shooting mode (AUTO), a program shooting mode (P), an aperture priority shooting mode (A), a shutter priority shooting mode (S), a manual shooting mode (M), a portrait shooting mode, a landscape shooting mode, a macro shooting mode, a sport shooting mode, and a night scene shooting mode. The control dial 24 is an operational member configured in a rotatable manner. As the control dial 24 is rotated, a desired set value, mode or the like can be selected.

Arranged on the backside of the camera body 200 are an LCD monitor 26, a playback button 27, a menu button 28, an UP button 30U, a DOWN button 30D, a RIGHT button 30R, a LEFT button 30L, an OK button 31, a display switching button 34, a white balance button 37, an ISO sensitivity button 38, and a dust removal button (dust removal instruction member) 39. The general term for the individual buttons 30U, 30D, 30R, 30L is an arrow pad 30.

The LCD monitor 26 is a display device to reproduce and display a subject image which has been shot, or display shooting conditions and menus. The monitor 26 is not limited to an LCD type as long as it can present those displays. The playback button 27 is an operational button to instruct display of a recorded subject image on the LCD monitor 26 after shooting. The operation of the playback button 27 decompresses the image data of the subject stored in compression mode like JPEG in a recording medium 245 and displays the decompressed image data on the LCD monitor 26.

The arrow pad 30 is an operational member to instruct movement of a cursor in the two-dimensional directions of the X direction and Y direction on the LCD monitor 26. As will be described later, the arrow pad 30 is also used to instruct a recording medium at the time of displaying a subject image recorded thereon. The four (UP, DOWN, LEFT, RIGHT) buttons may be replaced with a switch which can be operated in the two-dimensional directions, such as a touch switch whose two-dimensional operational direction can be detected. The OK button 31 is an operational member to set various items selected by the arrow pad 30, the control dial 24 or the like. The menu button 28 is used to switch the mode to a menu mode for setting various modes of the digital camera. When the menu mode is selected by operating the menu button 28, a menu screen is displayed on the LCD monitor 26. The menu screen has a hierarchical structure such that various items are selected with the arrow pad 30 and the selection is settled by operating the OK button 31.

The display switching button 34 is an operational button to switch between a live view display and an information display both of which will be described later. The live view display is a mode for displaying a subject image to be viewed on the LCD monitor 26 based on the output of the CCD 221 for recording subject images. The information display is a mode which is displayed on the LCD monitor 26 to display and set shooting information. The white balance button 37 is an operational button to set the white balance. Operating the white balance button 37 displays a setting screen on the LCD monitor 26 to display individual modes, such as auto, sunlight, cloudy sky, shadow, electric bulb, fluorescent lamps 1-3 and one-shot. The user can select each of the modes by rotating the control dial 24 and set the mode by operating the OK button 31.

The ISO sensitivity button 38 is an operational button to set the ISO sensitivity. Operating the ISO sensitivity button 38 displays the setting screen on the LCD monitor 26. The user selects each of auto and sensitivities 100 to 1600 by rotating the control dial 24 and set the selection by operating the OK button 31. In case where the user leaves the selection to the digital camera, the user selects auto. In case where the user has some shooting intention, the user can arbitrarily select the sensitivity within the range of 100 to 1600. As will be described later, the dust removal button 39 is an operational button to operate a dust removing mechanism arranged in front of the CCD 221 as an image pickup device. In the embodiment, a dust removing mechanism which uses ultrasonic vibration is employed to effect ultrasonic vibration on the optical element in front of the CCD 221, thereby removing adhered dust.

A recording medium retaining lid 40 is attached to a side surface of the camera body 200 in an openable/closable manner. With the recording medium retaining lid 40 open, a mount slot for the recording medium 245 provided inside becomes operable, so that the recording medium 245 can be detachably loaded into the camera body 200.

Figure 2:
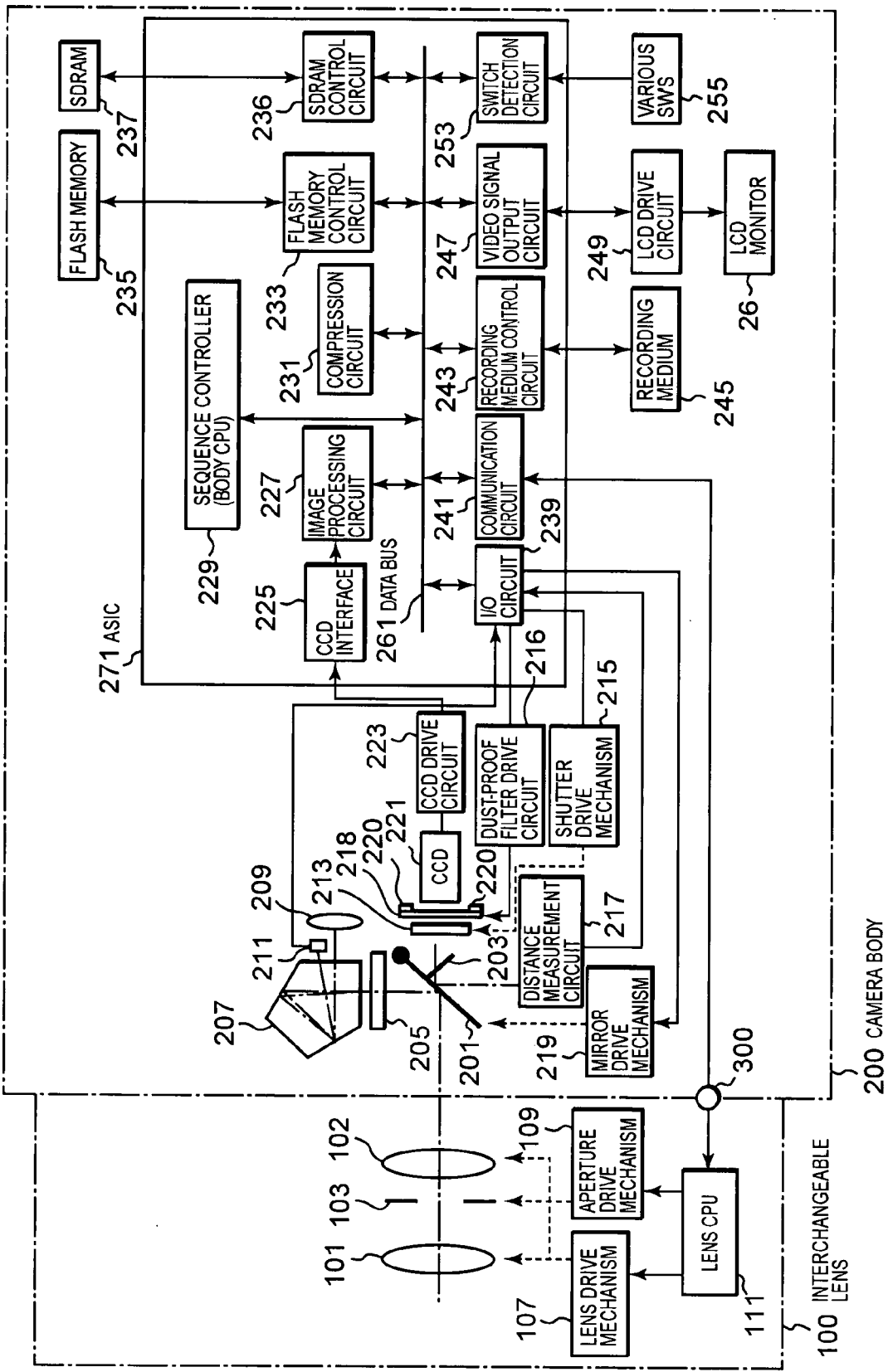
FIG. 2 is a block diagram showing the general configuration of the digital single-lens reflex camera according to the embodiment of the invention.

Referring now to FIG. 2, the general structure of the digital single-lens reflex camera, mainly the electric system thereof, will be described next. The digital single-lens reflex camera according to the embodiment comprises an interchangeable lens 100 and the camera body 200. In the embodiment, the interchangeable lens 100 and the camera body 200 are configured as separate components and are electrically connected with a communication contact 300. The interchangeable lens 100 and the camera body 200 can however be configured as an integrated part.

Disposed in the interchangeable lens 100 are lenses 101 and 102 for focusing and zooming and an aperture 103 for regulating the amount of opening. The lens 101 and the lens 102 are driven by a lens drive mechanism 107. The aperture 103 is connected in such a way to be driven by an aperture drive mechanism 109. The lens drive mechanism 107 and the aperture drive mechanism 109 are connected to a lens CPU 111, which is connected to the camera body 200 via the communication contact 300. The lens CPU 111 controls the internal components of the interchangeable lens 100. The lens CPU 111 controls the lens drive mechanism 107 to perform focusing and zoom driving, and controls the aperture drive mechanism 109 to control the aperture value.

A movable reflecting mirror 201 is provided inside the camera body 200. The movable reflecting mirror 201 is rotatable between a position inclined by 45 degrees to the lens optical axis for reflecting a subject image to the finder optical system and a position flipped up to guide the subject image to the image pickup device (CCD 221 to be discussed later). A focusing screen 205 is arranged above the movable reflecting mirror 201 to form the subject image thereon. A pentaprism 207 is arranged above on the focusing screen 205 to flip the subject image horizontally left to right. An eyepiece lens 209 used for viewing the subject image is arranged on the exit side of the pentaprism 207 (on the right side in FIG. 1). A photometric sensor 211 is arranged at the side of the eyepiece lens 209 and in such a position as not to interfere with viewing of the subject image. The photometric sensor 211 includes multi-zone photometric elements for dividing the subject image and measuring the brightness of the subject image on each element.

The central portion of the movable reflecting mirror 201 is formed into a half mirror. A sub-mirror 203 is provided on the backside of the movable reflecting mirror 201 to reflect a subject light flux passing through the half mirror portion downward in the camera body 200. The sub-mirror 203 is movable with respect to the movable reflecting mirror 201. When the movable reflecting mirror 201 is flipped up, the sub-mirror 203 is moved to a position to cover the half mirror portion, while when the movable reflecting mirror 201 is at the position for viewing the subject image, the sub-mirror 203 is at a position where it is perpendicular to the movable reflecting mirror 201 as shown in FIG. 1. The movable reflecting mirror 201 is driven by a mirror drive mechanism 219. Further, a distance measurement circuit 217 including a distance measurement sensor is arranged below the sub-mirror 203. This circuit 217 measures the amount of defocus of the subject image formed from the light passing through the lenses 101 and 102.

A focal-plane type shutter 213 for control of exposure time is arranged behind the movable reflecting mirror 201. The driving of the shutter 213 is controlled by a shutter drive mechanism 215. The CCD 221 as an image pickup device is arranged behind the shutter 213 to photoelectrically convert, into an electric signal, the subject image formed thereon from light passing through the lenses 101 and 102. In the embodiment, the CCD is used as the image pickup device, but the present invention is not limited thereto, and any other image pickup devices, such as a CMOS (Complementary Metal Oxide Semiconductor) can be used.

A dust removing mechanism is arranged between the shutter 213 and the CCD 221. The dust removing mechanism includes a dust-proof filter 218 as a dust-proof optical element, and a piezoelectric element 220 as a vibration exciting member which is arranged in abutment with the periphery or peripheral portion of the dust-proof filter 218. The piezoelectric element 220 is driven by a dust-proof filter drive circuit 216. The details of the dust removing mechanism will be given later referring to FIG. 3. The CCD 221 is connected to a CCD drive circuit 223 which performs analog-digital conversion (AD conversion). The CCD drive circuit 223 is connected to an image processing circuit 227 through a CCD interface 225. The image processing circuit 227 performs various kinds of image processing, such as color correction, gamma (γ) correction, contrast correction, monochromatic/color mode processing and live view display processing.

The image processing circuit 227 is connected to a data bus 261 inside an ASIC (Application Specific Integrated Circuit) 271. Connected to the data bus 261 other than the image processing circuit 227 are a sequence controller (hereinafter referred to as "body CPU") 229, a compression circuit 231, a flash memory control circuit 233, an SDRAM control circuit 236, an I/O circuit 239, a communication circuit 241, a recording medium control circuit 243, a video signal output circuit 247, and a switch detection circuit 253, as will be described later.

The body CPU 229 connected to the data bus 261 controls the overall operational flow of the digital single-lens reflex camera. The compression circuit 231 connected to the data bus 261 is a circuit for compressing image data stored in an SDRAM 237 using JPEG or TIFF format. Note that the image compression format is not limited to JPEG or TIFF, and any other compression methods can be employed.

The flash memory control circuit 233 connected to the data bus 261 is connected to a flash memory 235. The flash memory 235 stores a program for controlling the overall operational flow of the single-lens reflex camera, and the body CPU 229 controls the single-lens reflex camera according to the program stored in the flash memory 235. The flash memory 235 is an electrically rewritable non-volatile memory.

The SDRAM 237 is connected to the data bus 261 through the SDRAM control circuit 236. The SDRAM 237 is a buffer memory for temporary storage of image data processed by the image processing circuit 227 or image data compressed by the compression circuit 231.

The I/O circuit 239 is connected with the photometric sensor 211, the shutter drive mechanism 215, the dust-proof filter drive circuit 216, the distance measurement circuit 217 and the mirror drive mechanism 219 to control the input and output of data to and from each circuit, such as the body CPU 229, through the data bus 261. The communication circuit 241 connected to the lens CPU 111 through the communication contact 300 is connected to the data bus 261 to communicate with the body CPU 229 and the like for exchange of data and communication of control instructions.

The recording medium control circuit 243 connected to the data bus 261 is connected to the recording medium 245 to control the recording of image data and the like onto the recording medium 245. The recording medium 245 is configured in such a way that any rewritable recording medium, such as an xD-Picture Card (Registered Trademark or ™), a Compact Flash (™), an SD Memory Card (™), or a Memory Stick (™), can be removably loaded into the camera body 200. Alternatively, a hard disk may be configured in such a way as to be connectable to the recording medium control circuit 243 through the communication contact.

The video signal output circuit 247 connected to the data bus 261 is connected to the LCD monitor 26 through an LCD monitor drive circuit 249. The video signal output circuit 247 is a circuit for converting image data, stored in the SDRAM 237 or the recording medium 245, into a video signal for display on the LCD monitor 26. The LCD monitor 26 is arranged on the backside of the camera body 200, but the location thereof is not limited to the backside. The LCD monitor 26 can be arranged in any position as long as the camera user can view the LCD monitor 26, and be of any type other than the LCD type.

Various switches 255 are connected to the data bus 261 through the switch detection circuit 253. The switches 255 include a switch which detects the first stroke and second stroke of the shutter release button, a switch which instructs the playback mode, a switch which instructs the ISO setting mode, a switch which instructs the white balance setting, a switch which instructs movement of the cursor on the screen on the LCD monitor 26, a switch which instructs the shooting mode, an OK switch which sets each mode or the like selected, and a switch which instructs display change.

Figure 3:
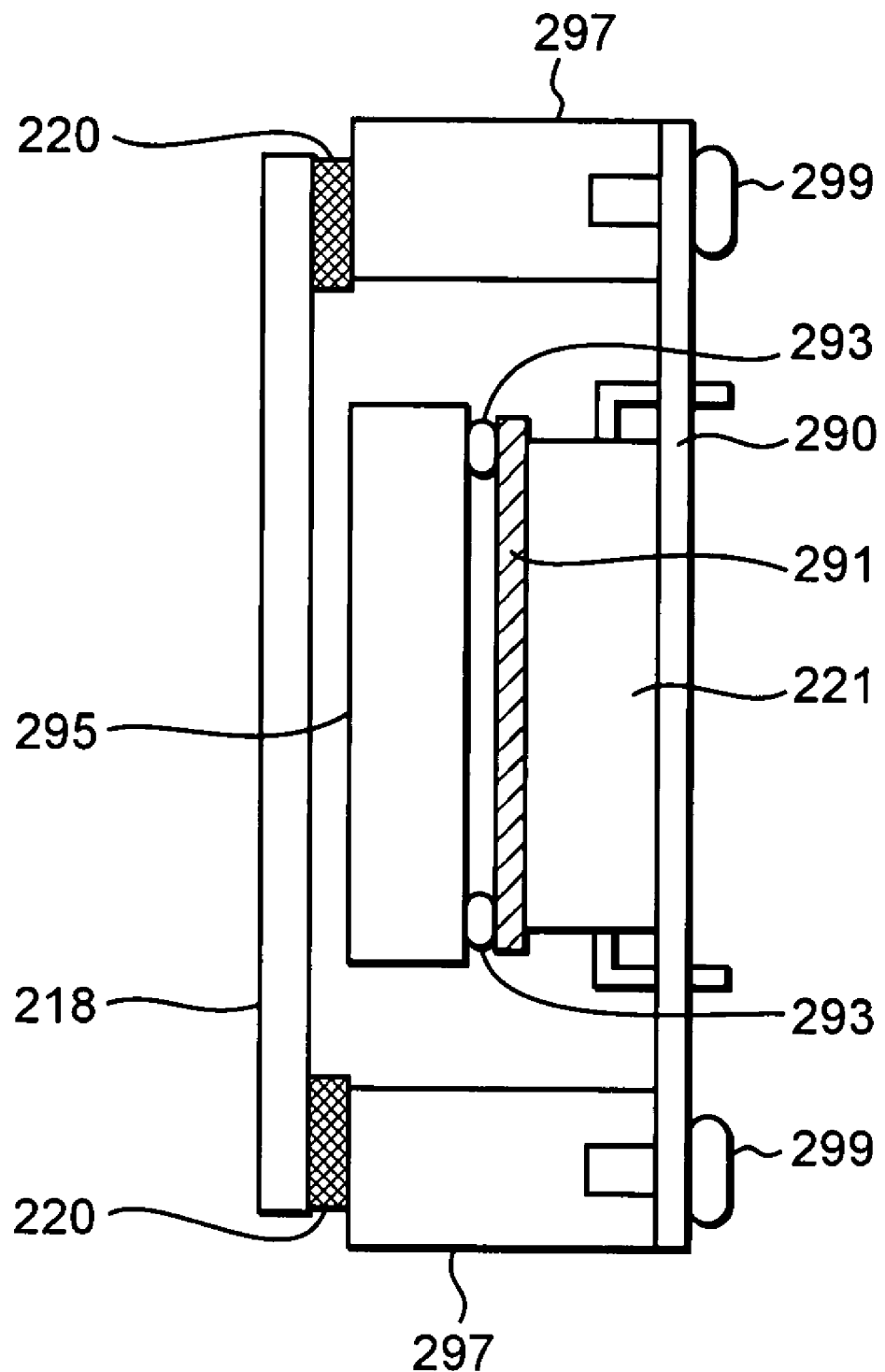
FIG. 3 is a cross-sectional view of a dust removing mechanism according to the embodiment of the invention.

The aforementioned dust removing mechanism will be described referring to FIG. 3. The CCD 221 which receives a subject image and photoelectrically converts the subject image is securely supported on a hard electric circuit board 290 by soldering. A protection glass 291 is provided integrally on the front side of the CCD 221 (which is the left-hand side in the diagram or on the lens 101 side). An optical low-pass filter 295 for removing a high-frequency component from a subject light flux passed the lenses 101 and 102 is provided in front of the protection glass 291. A low-pass filter receiving member 293 for receiving the optical low-pass filter 295 is arranged at the peripheral portion of the protection glass 291 in a sealing manner so that dust or the like does not enter. The dust-proof filter 218 formed of transparent glass is arranged in front of the optical low-pass filter 295, and the piezoelectric element 220 is arranged at the peripheral portion of the dust-proof filter 218 to apply a predetermined vibration to the dust-proof filter 218.

The piezoelectric element 220 is held between the dust-proof filter 218 and an image pickup device retaining case 297, and is securely pressed against the end portion of the image pickup device retaining case 297 by a mount member (not shown). The image pickup device retaining case 297 is fixed to the hard electric circuit board 290 by screws 299. The vibration at the piezoelectric element 220 is shielded so as not to be transmitted to the image pickup device retaining case 297. The CCD 221, the optical low-pass filter 295 and the like are sealed by the dust-proof filter 218, the piezoelectric element 220, the image pickup device retaining case 297 and the like. The piezoelectric element 220 is driven by the dust-proof filter drive circuit 216 so that the dust-proof filter 218 vibrates at a predetermined ultrasonic frequency, thereby removing dust adhered to the front side of the dust-proof filter 218 using the vibration. The dust removing mechanism is not limited to the ultrasonic vibration type as in the embodiment, and other various schemes, such as using an air pump or the like to blow off dust by an air flow and using static electricity to collect dust, can be used adequately instead as long as dust adhered to the image pickup device itself or the optical element arranged in front of the image pickup device can be removed. Further, the image pickup device unit itself may be driven to remove dust using the acceleration applied to the image pickup device unit.

Figure 4:
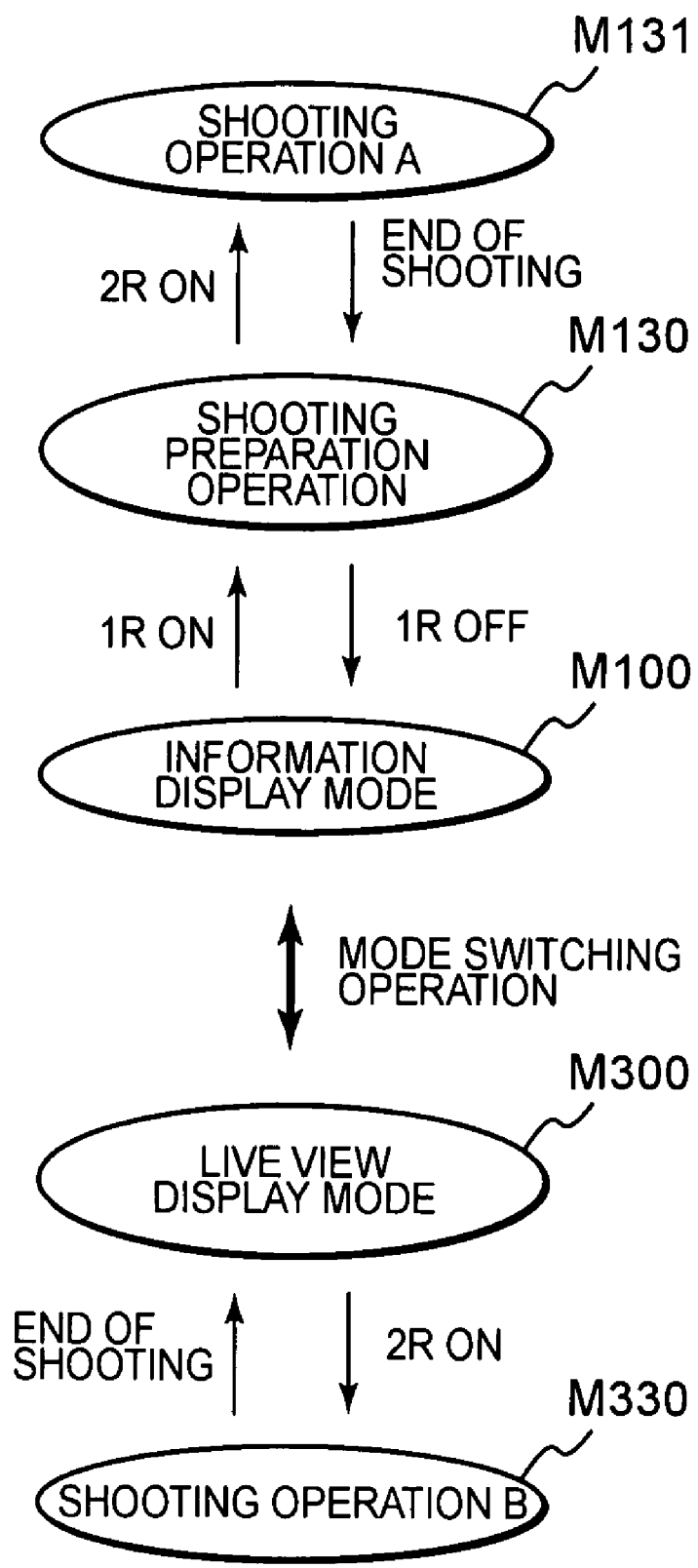
FIG. 4 is a block diagram showing the display mode of the digital single-lens reflex camera according to the embodiment of the invention and the hierarchical structure of an operational mode menu thereof.

The display and operational modes of the camera body 200 will be schematically explained referring to FIG. 4. An information display M100 is a state where the initialization is executed when the power switch of the camera body 200 is set on. In the information display M100, a basic information display is performed at the time of shooting a subject with the camera, and an information display screen for the shooting mode, shutter speed, aperture, AF mode, flash and the number of pixels is displayed. A shooting mode such as a program mode or a shutter speed priority mode is set by rotating the mode dial 22. Items, such as the sensitivity, shutter speed, aperture value, correction value and the number of pixels are selected by operating the arrow pad 30 on the information display screen, and a value is set by operating the control dial 24.

In the information display M100, when the camera user presses the release button 21 halfway, the 1R switch becomes ON to enter a shooting preparation operation M130. In the shooting preparation operation M130, when the camera user removes his/her finger from the release button 21 to release the half depression, the display returns to the information display M100. In the shooting preparation operation M130, preparation operations for shooting, such as light metering and distance measurement, are performed. When the camera user presses the release button 21 fully thereafter, a shooting operation A M131 is executed. In the shooting operation A M131, a photoelectrically converted signal of the subject image is acquired from the CCD 221, and is processed by the image processing circuit 227, and image data is then recorded on the recording medium 245.

In the information display mode M100, when the display switching button 34 is operated, the mode is switched to a live view display mode M300. In the live view display mode M300, the subject image to be viewed is displayed on the LCD monitor 26 using the output of the CCD 221 for recording the subject image. In the live view display mode M300, no particular operation is performed with the release button 21 pressed halfway, while when the release button 21 is pressed fully, a shooting operation B M330 is executed.

In the shooting operation B, the subject image data acquired by the CCD 221 is recorded on the recording medium 245. When the shooting operation B ends, the mode returns to the live view display mode.

Figure 5:
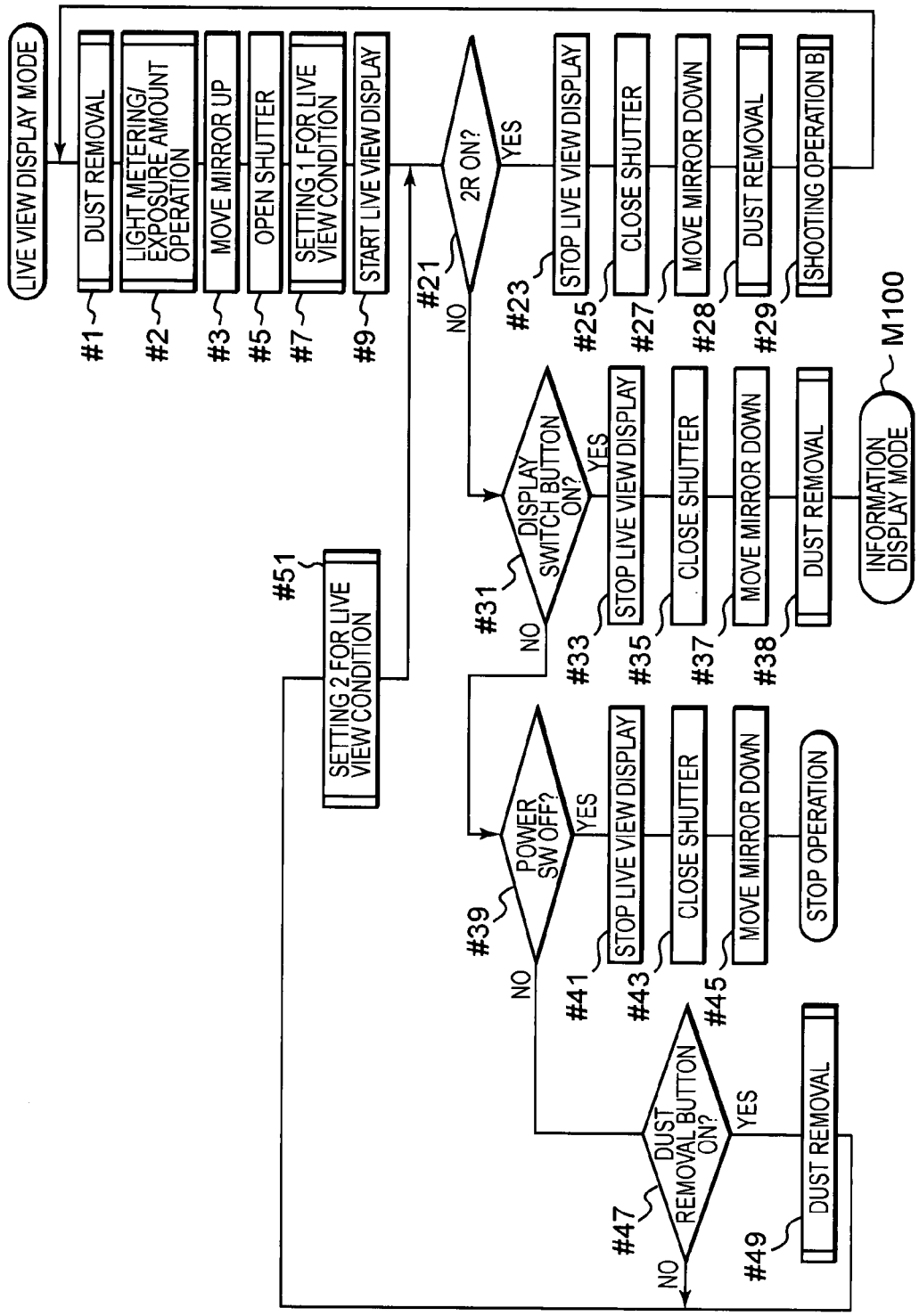
FIG. 5 is a flowchart for a live view display mode according to the embodiment of the invention.

The live view display mode M300 will be described in detail referring to the flowchart shown in FIG. 5. When the mode enters the live view display mode, first, a dust removal operation is performed (#1). The dust removal operation applies drive voltage to the piezoelectric element 220 through the dust-proof filter drive circuit 216 to cause ultrasonic vibration of the dust-proof filter 218, thereby removing dust or the like. The detailed operation will be described later referring to FIG. 6. Next, the brightness of the subject is measured based on the output of the photometric sensor 211, and an exposure amount operation is performed to acquire the shutter speed and/or the aperture value based on the obtained brightness of the subject (#2).

The shutter speed and/or the aperture value are acquired according to the aforementioned shooting mode. Thereafter, a preparation is made to acquire a subject image based on the output of the CCD 221. Accordingly, the movable reflecting mirror 201 is flipped up (#3) to guide the subject light flux from the lenses 101 and 102 toward the CCD 221 from the finder optical system. When the movable reflecting mirror 201 is flipped up, the flow proceeds to step #5 to open the shutter 213. When the shutter 213 is opened, the subject image is formed on the CCD 221.

Thereafter, a subroutine for a live view condition setting 1 is executed using the results of the operation of the light metering/exposure amount operation acquired in step #2 (#7). Through the execution of the subroutine, which will be described in detail later referring to FIG. 8, an image with the adequate brightness can be displayed on the LCD monitor 26. When the live view condition setting 1 ends, it is ready for live view display, so that display of the subject image on the LCD monitor 26 is started in step #9. Control of the live view display operation is carried out by the image processing circuit 227 in response to a start instruction.

Next, it is determined in step #21 whether the release button 21 is pressed fully, i.e., whether the 2R is ON. When the 2R is ON, a sequence of operations from step #23 to step #27 are executed to stop live view display as a preparation operation for executing the shooting operation B. First, the power supply to the CCD 221 is stopped to stop the live view display on the LCD monitor 26 (#23). Then, the shutter 213 is closed (#25) and the movable reflecting mirror 201 is flipped down, the subject light flux is switched from the CCD 221 side to the finder optical system side (#27).

When completion of the flip-down movement of the movable reflecting mirror 201 is detected, the dust removal operation is performed as done in step #1, thereby removing dust adhered to the dust-proof filter 218. As the dust removal operation is performed after the stopping of the live view display and before a shooting operation, it is possible to prevent the shadow of dust from entering the recorded image which would otherwise degrade the image quality. It is also possible to prevent dust-oriented degrading of the image quality when the live view display is resumed after the shooting operation ends.

When the dust removal operation ends, the flow proceeds to the routine for the next shooting operation B (#29). In this routine, still image data is acquired based on the output of the CCD 221 and is recorded on the recording medium 245. The details will be given later referring to FIG. 7. When the shooting operation B ends, the flow returns to step #1 and the above-described operations will be repeated therefrom. Returning to step #1 can allow dust removal to be executed every time shooting ends, making it possible to prevent dust-oriented degrading of the image quality at the time of providing the live view display.

When the 2R is OFF in step #21, the flow proceeds to step #31 to determine whether the display switching button 34 is ON or not. When it is determined that the display switching button 34 is operated and ON, a preparation operation for returning to the information display mode M100 is executed. Because steps #33 to #38 in the preparation operation are similar to the steps #23 to #28, descriptions of their details will be omitted. When the dust removal operation ends in step #38, the flow goes to the information display mode M100. Because dust may adhere while the shutter 213 is open, dust removal is performed in step #38 as done in step #28.

When it is determined in step #31 that the display switching button 34 is OFF, the flow proceeds to step #39 to determine whether the power switch (not shown) is OFF or not. When it is determined that the power switch is OFF, a power-OFF operation is performed before which steps #41 to #45 are executed as a preparation operation for the power-OFF operation. Because steps #41 to #45 are similar to the steps #23 to #27, description of their details will be omitted. When the movable reflecting mirror 201 is flipped down in step #45, the digital camera is powered off to stop the operation.

When it is determined in step #39 that the power switch is not OFF, the flow proceeds to step #47 to determine whether the dust removal button 39 is ON or not. When the dust removal button 39 is operated and ON, the flow proceeds to step #49 to perform dust removal as done in step #1. In the dust removal operation, the drive voltage is applied to the piezoelectric element 220 through the dust-proof filter drive circuit 216 to cause ultrasonic vibration of the dust-proof filter 218, thereby removing dust or the like.

When the dust removal button is OFF in step #47 or the dust removal operation ends in step #49, the flow proceeds to step #51. In the step #51, the live view condition setting 2 is executed after which the flow returns to step #21 to repeat the above-described steps. The live view condition setting 2 in step #51 is a subroutine intended to adequately keep the brightness of the live view display on the LCD monitor 26 as described above. While the live view condition setting 1 in step #7 is prior to the live view display and is thus performed based on the output of the photometric sensor 211, the electronic shutter speed and the sensitivity are determined from the difference between the target brightness and the screen brightness based on the previous shooting result in the live view condition setting 2. The "brightness" herein is a value corresponding to, for example, the weighted average value of the individual pixel outputs of the CCD 221.

Figure 6:
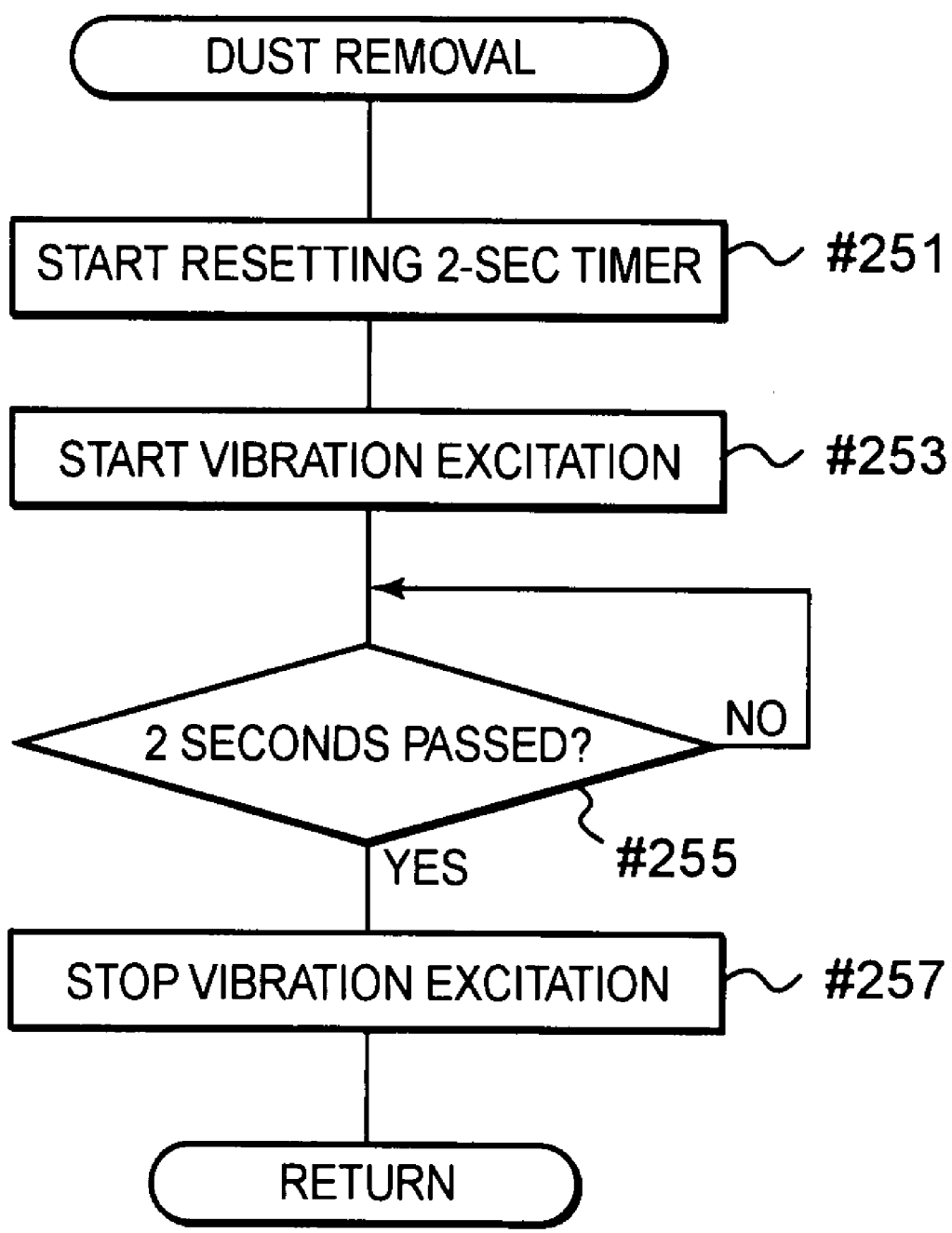
FIG. 6 is a flowchart illustrating a dust removing operation according to the embodiment of the invention.

Next, the subroutine for dust removal in steps #1, #28, #38 and #49 will be described referring to FIG. 6. When the flow enters this subroutine, first, a 2-sec timer is reset and started (#251). This process is performed to measure the time of two seconds over which the dust removal operation is executed continuously in the embodiment. Then, the vibration excitation of the piezoelectric element 220 via the dust-proof filter drive circuit 216 is started (#253). This causes ultrasonic vibration of the dust-proof filter 218 to remove dust as mentioned above. When elapse of the vibration excitation for two seconds is detected in step #255, the flow proceeds to step #257 to stop the vibration excitation.

In the embodiment, as the dust removal operation is performed (step #1) prior to the initiation of the live view display (step #9), a phenomenon that the shadow of dust is displayed on the LCD monitor 26 is diminished, thus preventing the image quality of the live view display from being degraded. If the dust removal operation is performed in step #1 as well as between steps #5 and #7 instead of in step #1 only, it is possible to remove dust which may appear through the operation of opening the shutter 213 in step #5.

Because the dust removal operation (step #28, #38) is performed after the live view display is stopped (step #23, #33) in the embodiment, it is possible to remove dust adhered when the shutter 213 is open for the live view display. As the dust removal operation is performed after stopping of the live view display and prior to the shooting operation B (#29), the shadow of dust does not enter in a picture at the time of shooting. Further, the dust removal operation in step #28, #38 is performed when the operation of closing the shutter 213 ends and the movable reflecting mirror 201 is flipped down, it is also possible to remove dust which appears in the shutter closing operation or the mirror flip-down operation. The provision of the dust removal button 39 in the embodiment is advantageous in that when the camera user wants to remove dust, the user can remove dust by manually operating the dust removal button 39.

Although the dust removal operation is executed in steps #1, #28 and #38 in the embodiment, all of the dust removal operations must be executed but some of them may be omitted. Although ultrasonic vibration caused by the piezoelectric element 220 is used as the dust removal operation, such ultrasonic vibration is not restrictive and may be replaced with any other dust removal operation, such as dust removal with an air flow, a scheme of collecting dust with static electricity, or a scheme of driving the image pickup device unit itself and removing dust using acceleration applied to the image pickup device unit.

Figure 7:
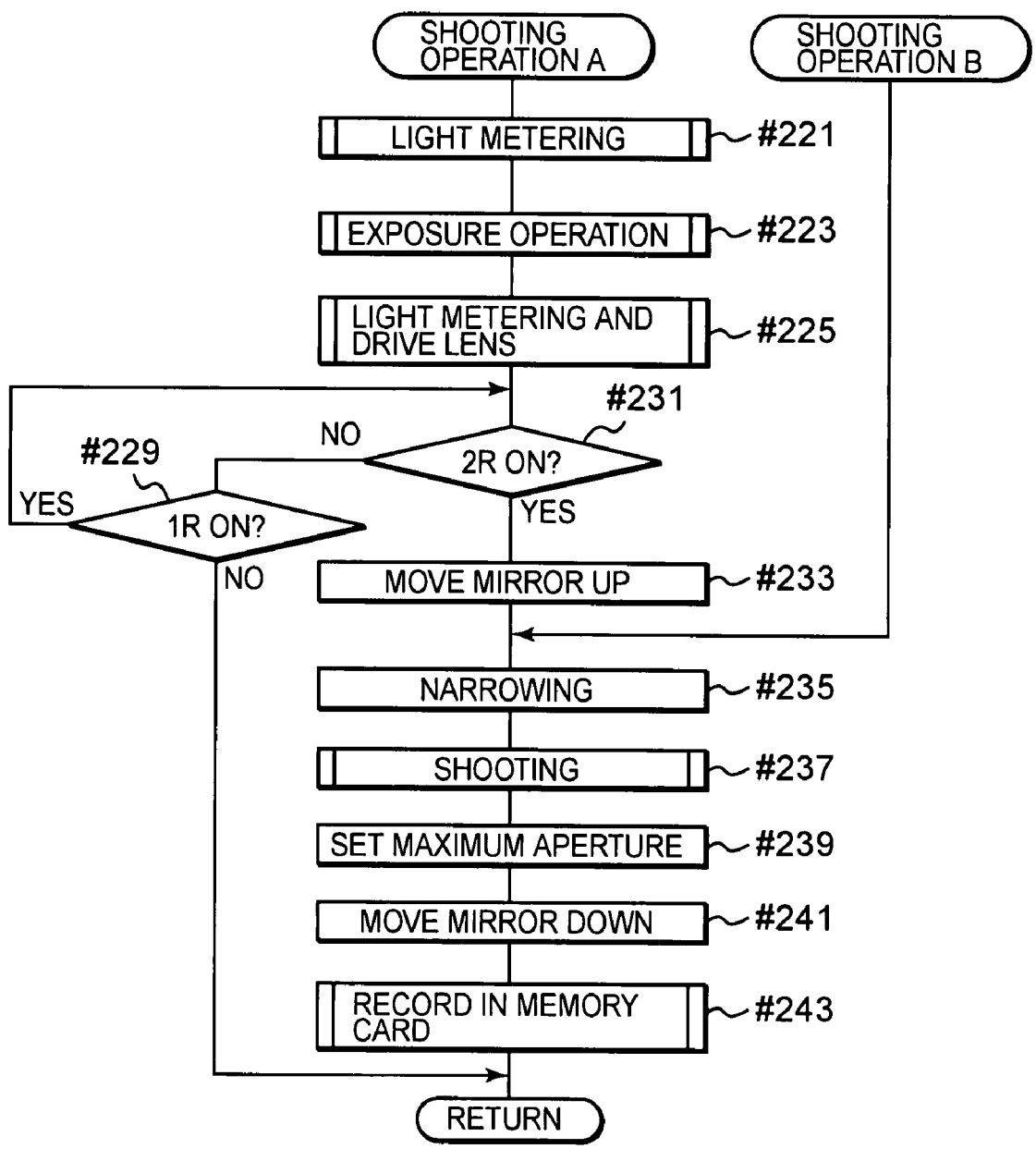
FIG. 7 is a flowchart illustrating a shooting operation A and a shooting operation B according to the embodiment of the invention.

Next, the details of the shooting preparation operation M130 and the shooting operation B M330 (step #29) will be given referring to the flowchart shown in FIG. 7. When the operation enters the shooting operation A, first, the brightness of a subject is measured based on the output of the photometric sensor 211 (#221). Based on the acquired subject brightness, the shutter speed and/or the aperture value is calculated (#223). Note that the shutter speed and/or the aperture value is obtained here based on a program line diagram according to the set shooting mode. Thereafter, the amount of defocus of the photographing lenses 101 and 102 is calculated based on the output of the distance measurement circuit 217, and the lens drive mechanism 107 is driven through the lens CPU 111 based on the amount of defocus (#225).

Next, it is determined whether the release button 21 has been pressed fully to set the second release switch on (#231). When the second release switch is not ON, it is determined whether the release button 21 has been pressed halfway to set the first release switch on (#229). When it is determined that the first release switch is ON, the release button 21 is pressed halfway, but not pressed fully yet. Therefore, the digital camera enters a standby state where steps #229 and #231 are repeated. When the camera user removes his/her finger from the release button 21 to set the first release switch off in step #229, the procedure follows the No branch to return to the original routine.

When the release button 21 is pressed fully, on the other hand, the second release switch is set on and the procedure follows the Yes branch in step #231, so that actual imaging and recording of image data or a shooting operation is performed in the procedures starting from step #233. First, the movable reflecting mirror 201 is flipped up (#233). Accordingly, the subject light flux having passed the photographing lenses 101, 102 is guided toward the CCD 221 (it is to be noted that the subject image is not formed on the CCD 221 yet because of the shutter 213 closed). Then, narrowing of the aperture 103 is started (#235), and imaging is performed when the narrowing operation ends (#237).

In the imaging operation, first, imaging by the CCD 221 is started and traveling of a front curtain of the shutter 213 is started, and after a predetermined time elapses, traveling of a rear curtain is started. After the traveling of the rear curtain is finished, imaging by the CCD 221 is stopped, the CCD drive circuit 223 reads out an image signal and the image processing circuit 227 performs image processing. The image data subjected to the image processing is stored in the SDRAM 237 as a buffer memory. Then, the aperture 103 is returned to the maximum open state (#239), and the movable reflecting mirror 201 is flipped down (#241) to let a finder optical device enter a subject viewing state. Next, the image data stored in the buffer memory such as the SDRAM 237 is recorded on the recording medium (memory card) 245 (#243) after which the flow returns to the original routine.

When the release button 21 is pressed fully to set the 2R on in the live view display mode M300, the operation enters the shooting operation B M330 and the above-described procedures starting from the step #235 are executed. As the individual steps are the same as described early, their description will not be repeated.

Next, the "live view condition setting 1" and "live view condition setting 2" will be described referring to FIG. 8. The subroutines are performed to adjust the image brightness at the time of displaying a subject image on the LCD monitor 26 as mentioned above. First, when the operation enters the subroutine for the live view condition setting 1, an electronic shutter speed TV1 and a sensitivity SV1 for the next shooting are determined based on an output Vs of the photometric sensor 211 in step S201. The aperture value in the live view display mode is the maximum aperture state. Given that the aperture value is AVs, the following relationship is fulfilled:

$$AVs + TV1 = BVs + SV1.$$

Rewriting the equation yields:

$$BVs - AVs = TV1 - SV1.$$

Because the left-hand side of the equation is a known value, TV1 and SV1 should be acquired properly from the value of the left-hand side according to a program line or table. Thereafter, the determined electronic shutter speed TV1 and sensitivity SV1 are stored and set in the respective registers (S207). Based on the set and stored TV1 and SV1, the CCD drive circuit 223 controls the driving of the CCD 221 to read out a photoelectrically converted signal. When the setting of TV1 and SV1 in step S207 is finished, the procedures returns to the original flow.

Next, the "live view condition setting 2" will be described. When the operation enters the subroutine for the live view condition setting 2, first, a difference ΔEV between the target image brightness (predetermined value) and the image brightness in the previous shooting is calculated (S203). Then, the electronic shutter speed TV1 and sensitivity SV1 in the next shooting are determined in such a way that the image brightness becomes constant (S205). The values are determined from the following factors:

maximum aperture value AV0;

electronic shutter speed TV0;

sensitivity SV0; and difference ΔEV between the target image brightness and the image brightness in the previous shooting.

A basic equation for an exposure condition is given by:

$$AV0 + TV0 = BV0 + SV0$$

where BV0 is the previous brightness whose true value is not known and is a temporary value. Because of the difference between the true brightness BV0 and the target value, i.e., the difference of ΔEV therefrom, the true brightness BV0 becomes $$BV0 = AV0 + TV0 - SV0 + \Delta EV$$
$$= AV1 + TV1 - SV1$$

and TV1 and SV1 are acquired from the equation. The difference of ΔEV should be acquired from, for example, the difference between the weighted average of the outputs of the individual pixels of the image pickup device and the target value. When the step S205 ends, the flow proceeds to the step S207, and the flow returns to the original flow after the step is executed.

According to the embodiment, as described above, the dust removal operation is performed when a move image display (live view display) is started or stopped, it is possible to make dust less noticeable in displaying a moving image. That is, because the dust removal operation is performed to remove dust prior to the initiation of the move image display, the image quality of the moving image is not degraded by the dust that would adhere before the initiation of the move image display. As the dust removal operation is performed after the moving image display is stopped, dust adhered while the shutter is open is removed, thus preventing the image quality from being degraded in the next moving image display.

Although the foregoing description has been given of a case of a digital single-lens reflex camera, the invention is not limited thereto, and can be adapted to a digital camera and an electronic imaging device which has an image pickup device and can display a moving image (live view display) based on the output of the image pickup device. While the dust-proof optical element is arranged in front of the image pickup device and is vibrated, the optical element may be integrated with the image pickup device so that both are vibrated.

Because the CCD 221 receives a subject light flux having passed the photographing lens and outputs a subject image signal in the embodiment, the CCD 221 can be called "imaging part". As the CCD drive circuit 223 and the image processing circuit 227 process the subject image signal output from the imaging part to generate image data, they can be called "image processing part". As the LCD monitor 26 displays image data generated by the image processing part, it can be called "display part".

The body CPU 229 is a control part which controls the imaging part, the image processing part and the display part to execute a live view display operation. The dust-proof filter 218 is an optical element is arranged in front of the imaging surface of the imaging part. The piezoelectric element 220 is a vibration exciting member to vibrate the optical element. The dust-proof filter drive circuit 216 supplies a periodic electric signal to the vibration exciting member.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera comprising:

an imaging part that receives a subject light flux which has passed a photographing lens and outputs a subject image signal;

an image processing part that processes the subject image signal output from the imaging part to thereby generate image data;

a display part that displays the image data generated by the image processing part;

a control part that executes a live view display operation which displays a moving image for observing a subject on the display part by controlling the imaging part, the image processing part and the display part;

an optical element arranged in front of an imaging surface of the imaging part;

a vibration exciting member that vibrates the optical element; and a drive circuit that supplies a periodic electric signal to the vibration exciting member, wherein the control part supplies, after a switching operation to a live view display mode is done and prior to the start of the live view display operation, a control signal for vibrating the optical element to the drive circuit for a predetermined period of time.

2. The digital camera according to claim 1, further comprising:

a focal plane shutter arranged in front of the imaging part; and a movable mirror arranged between the photographing lens and the optical element, wherein the control part controls, after the switching operation to a live view display mode is done and prior to an operation of retracting the movable mirror out of a shooting optical path and an operation of opening the focal plane shutter, supplies the control signal for vibrating the optical element to the drive circuit for the predetermined period of time.

3. The digital camera according to claim 1, further comprising a dust-proof instructing member, wherein the control part supplies the control signal for vibrating the optical element to the drive circuit when the dust-proof instructing member is manually operated during execution of the live view display operation.

4. The digital camera of claim 1 wherein the control part supplies the control signal responsive to a switching operation to a live view display mode.

5. A control method for a digital camera that has a live view display function of repeatedly shooting a subject image to display a move image on a display device, wherein causing a dust-proof optical element arranged in a shooting optical path to vibrate after a switching operation to a live view display mode is done and prior to the start of a live view display operation for a predetermined period of time.

6. The control method according to claim 5, wherein the dust-proof optical element is vibrated for a predetermined period of time when a manual operation member is operated during execution of the live view display operation.

* * * * *